United States Patent
Kochi et al.

(10) Patent No.: US 12,014,570 B2
(45) Date of Patent: Jun. 18, 2024

(54) FACE AUTHENTICATION APPARATUS

(71) Applicant: NEC Corporation, Tokyo (JP)

(72) Inventors: Taketo Kochi, Tokyo (JP); Kenji Saito, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/114,015

(22) Filed: Feb. 24, 2023

(65) Prior Publication Data

US 2023/0222832 A1 Jul. 13, 2023

Related U.S. Application Data

(63) Continuation of application No. 17/490,695, filed on Sep. 30, 2021, now Pat. No. 11,625,949, which is a continuation of application No. 16/961,537, filed as application No. PCT/JP2018/047065 on Dec. 20, 2018, now Pat. No. 11,163,979.

(30) Foreign Application Priority Data

Jan. 12, 2018 (JP) ................................ 2018-003232

(51) Int. Cl.
*G06V 40/00* (2022.01)
*G06V 40/16* (2022.01)

(52) U.S. Cl.
CPC .......... *G06V 40/166* (2022.01); *G06V 40/168* (2022.01); *G06V 40/172* (2022.01)

(58) Field of Classification Search
CPC ........... G06K 9/00255; G06K 9/00268; G06K 9/00288
See application file for complete search history.

(56) References Cited

U.S. PATENT DOCUMENTS

| | | | |
|---|---|---|---|
| 2007/0237367 A1 | 10/2007 | Yamato et al. | |
| 2008/0253662 A1* | 10/2008 | Funaki | G06V 40/16 382/209 |
| 2009/0091420 A1* | 4/2009 | Dobashi | G06V 40/172 340/5.2 |

(Continued)

FOREIGN PATENT DOCUMENTS

| | | |
|---|---|---|
| EP | 2 530 645 A1 | 12/2012 |
| EP | 2 562 716 A1 | 2/2013 |

(Continued)

OTHER PUBLICATIONS

Office Action for corresponding JP 2018-003232, dated Feb. 4, 2019.

(Continued)

*Primary Examiner* — Md K Talukder

(57) ABSTRACT

A face authentication apparatus includes a face image acquisition unit that acquires a face image of an authentication target, a collation unit that performs face authentication by calculating similarity between face information of the face image of the authentication target and reference face image of each registered user and comparing the similarity with a threshold, a prediction unit that predicts a change in the similarity on the basis of similarity history on authentication success, and a threshold change unit that changes the threshold on the basis of the prediction result.

5 Claims, 11 Drawing Sheets

(56) References Cited

U.S. PATENT DOCUMENTS

| | | | |
|---|---|---|---|
| 2013/0039590 A1* | 2/2013 | Yoshio | G06V 10/764 |
| | | | 382/218 |
| 2013/0063581 A1* | 3/2013 | Komatsu | G06V 40/50 |
| | | | 348/E7.085 |
| 2013/0077874 A1 | 3/2013 | Suzuki | |
| 2016/0292536 A1* | 10/2016 | Irie | G06V 40/172 |
| 2018/0005021 A1* | 1/2018 | Young | G06V 40/165 |
| 2018/0144481 A1* | 5/2018 | Shibata | G06V 40/173 |
| 2018/0189470 A1* | 7/2018 | Kim | G06F 21/316 |
| 2019/0042835 A1* | 2/2019 | Mostafa | G06F 21/32 |
| 2019/0080153 A1* | 3/2019 | Kalscheur | G06F 16/56 |
| 2020/0159899 A1* | 5/2020 | Maeno | H04L 9/3231 |
| 2020/0159999 A1 | 6/2020 | Kazuki | H04L 9/3231 |
| 2021/0056289 A1* | 2/2021 | Kochi | G06V 40/168 |

FOREIGN PATENT DOCUMENTS

| | | |
|---|---|---|
| EP | 3 076 320 A1 | 10/2016 |
| JP | 11-104112 A | 4/1999 |
| JP | 2001-202513 A | 7/2001 |
| JP | 2006-039720 | 2/2006 |
| JP | 2007-011764 A | 1/2007 |
| JP | 2007-226327 A | 9/2007 |
| JP | 2008-079680 A | 4/2008 |
| JP | 2008-257404 A | 10/2008 |
| JP | 2013-117876 A | 6/2013 |
| JP | 2016-189162 A | 11/2016 |

OTHER PUBLICATIONS

Decision of Refusal for corresponding JP 2018-003232, dated Aug. 20, 2019.

Decision to Grant a Patent for corresponding JP 2018-003232, dated Dec. 17, 2019.

International Search Report for PCT/JP2018/047065, dated Mar. 19, 2019.

Extended European Search Report for EP Application No. EP18899315.8 dated Feb. 2, 2021.

* cited by examiner

FACE AUTHENTICATION APPARATUS

CROSS REFERENCE TO RELATED APPLICATIONS

This application is a Continuation of U.S. application Ser. No. 17/490,695 filed Sep. 30, 2021, which is a Continuation of U.S. application Ser. No. 16/961,537 filed Jul. 10, 2020, which issued as U.S. Pat. No. 11,163,979, which is a National Stage of International Application No. PCT/JP2018/047065 filed Dec. 20, 2018, which claims priority based on Japanese Patent Application No. 2018-003232 filed Jan. 12, 2018, the contents of which are incorporated herein by reference in their entirety.

TECHNICAL FIELD

The present invention relates to a face authentication apparatus, a face authentication method, and a recording medium.

BACKGROUND ART

Conventionally, in various systems such as an access monitoring system and an attendance management system, personal authentication using a face image is performed on a user passing through a gate or the like.

For example, Patent Literature 1 and Patent Literature 2 disclose a face authentication apparatus that performs face authentication by acquiring a face image of an authentication target, calculating similarity between the face image of the authentication target and a reference face image of a person that is previously registered, and comparing it with a threshold.

Further, in the face authentication apparatus of this type, a configuration of automatically changing a threshold to be used for collation is employed.

For example, in Patent Literature 1, when authentication failed, it is determined whether or not the brightness of the face image of the authentication target is appropriate, and if not, the threshold is lowered to decrease the false rejection rate. In Patent Literature 2, a threshold is changed according to the difference between the similarity on authentication success and the threshold. Specifically, in Patent Literature 2, when the authentication process succeeds, if the similarity on authentication success largely exceeds the threshold, the threshold is determined to be too small so that the threshold is corrected to be larger.

Patent Literature 1: JP 2007-226327 A
Patent Literature 2: JP 2013-117876 A

SUMMARY

In the method of Patent Literature 1, it is determined whether or not the brightness of the face image is appropriate when the face authentication failed, and if it is not appropriate, the threshold is decreased. Therefore, the threshold can be changed only after the authentication failed, so that the convenience is lowered.

Meanwhile, in the method of Patent Literature 2 in which the threshold is changed according to the difference between the similarity on authentication success and the threshold, the threshold can be changed before face authentication fails. However, in the method disclosed in Patent Literature 2, it is difficult to change the threshold appropriately. This is because in the method of Patent Literature 2, the threshold is changed on the basis of the similarity on authentication success.

An exemplary object of the present invention is to provide a face authentication apparatus that solves the aforementioned problem.

1. A face authentication apparatus according to one aspect of the present invention includes
   a face image acquisition unit that acquires a face image of an authentication target,
   a collation unit that performs face authentication by calculating similarity between face information based on the face image of the authentication target and reference face information of each registered user and comparing the similarity with a threshold,
   a prediction unit that predicts a change in the similarity on the basis of a similarity history on authentication success, and
   a threshold change unit that changes the threshold on the basis of a result of the prediction.

A face authentication method according to another aspect of the present invention includes
   acquiring a face image of an authentication target,
   performing face authentication by calculating similarity between face information based on the face image of the authentication target and reference face information of each registered user and comparing the similarity with a threshold,
   predicting a change in the similarity on the basis of a similarity history on authentication success, and
   changing the threshold on the basis of a result of the prediction.

A computer-readable medium according to another aspect of the present invention is a medium storing a program for causing a computer to function as
   a face image acquisition unit that acquires a face image of an authentication target,
   a collation unit that performs face authentication by calculating similarity between face information based on the face image of the authentication target and reference face information of each registered user and comparing the similarity with a threshold,
   a prediction unit that predicts a change in the similarity on the basis of a similarity history on authentication success, and
   a threshold change unit that changes the threshold on the basis of a result of the prediction.

With the configurations described above, the present invention is able to change the threshold before face authentication fails.

EXEMPLARY EMBODIMENTS

Next, exemplary embodiments of the present invention will be described in detail with reference to the drawings.

First Exemplary Embodiment

Figure 1:
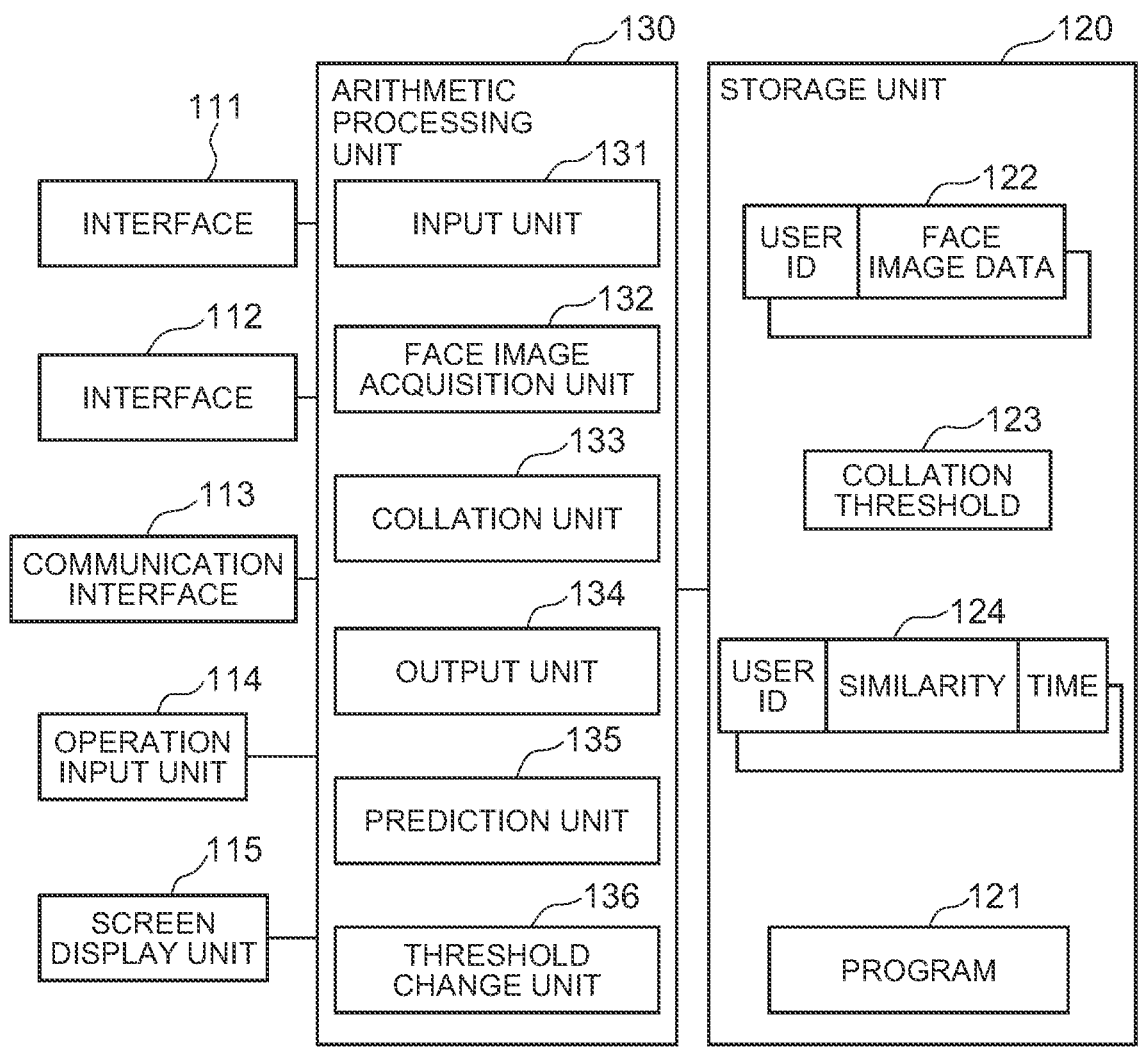
FIG. 1 is a block diagram of a face authentication apparatus according to a first exemplary embodiment of the present invention.
Figure 2:
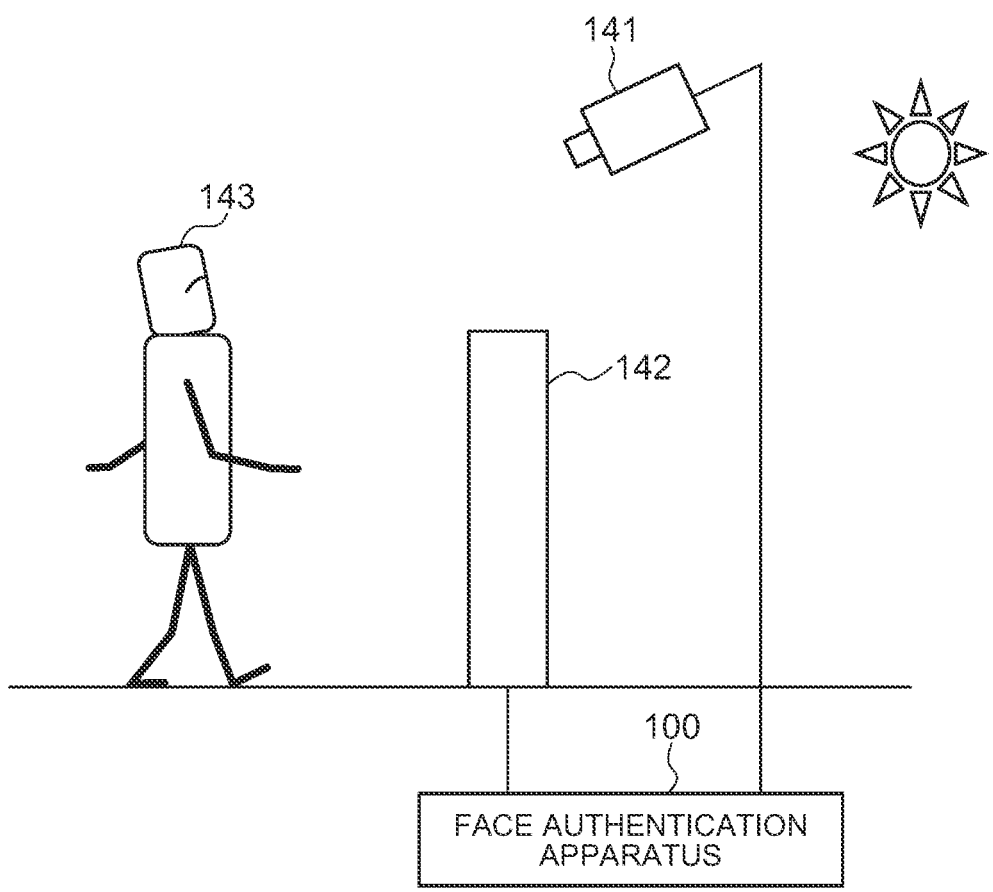
FIG. 2 illustrates an example of a system to which a face authentication apparatus of the present invention is applied.

FIG. 1 is a block diagram of a face authentication apparatus 100 according to a first exemplary embodiment of the present invention. FIG. 2 is a schematic diagram of an access management system including the face authentication apparatus 100 according to the present embodiment. Referring to FIG. 1, the face authentication apparatus 100 of the present embodiment includes an interface 111 with a camera unit 141, an interface 112 with a gate apparatus 142, a communication interface 113, an operation input unit 114, a screen display unit 115, a storage unit 120, and an arithmetic processing unit 130.

The interface 111 is configured to transmit and receive signals with the camera unit 141 that images a face of a person who is an authentication target. Transmission and reception of signals may be performed via wired or wireless communication. As illustrated in FIG. 2, the camera unit 141 is set at a position with an image angle where the camera unit 141 can image a face portion of a user 143 who passes through the gate apparatus 142. The camera unit 141 is an imaging device configured of a Charge Coupled Device (CCD), a Complementary Metal-Oxide Semiconductor (CMOS) device, or the like that outputs image data captured by imaging a face of a person who is an authentication target to the arithmetic processing unit 130 via the interface 111. The image data captured by the camera unit 141 is, for example, a black-and-white gradation image of 256 gradations but may be a color image.

The interface 112 is configured to transmit and receive signals such as results of face authentication to and from the gate apparatus 142. Transmission and reception of signals may be performed via wired or wireless communication. The gate apparatus 142 performs predetermined operation according to the received result of the face authentication. Predetermined operation may include various types of operation. For example, the gate apparatus 142 automatically performs open/close operation of a door attached to the gate apparatus 142 according to the result of face authentication. The gate apparatus 142 may include a gate bar that is manually openable/closable, and release lock of the gate bar for a certain period only when face authentication has succeeded. The gate apparatus 142 may output a message of passage propriety visually or by sound from an alarm provided to the gate apparatus 142 according to the result of face authentication. The gate apparatus 142 may be a stationary type, or a portable type that can be moved. The gate apparatus 142 may be an apparatus independent of the face authentication apparatus 100, or an apparatus integrated with the face authentication apparatus 100.

The communication interface 113 is a communication device that performs data communication with an external device such as a terminal. The communication system may be wired or wireless communication.

The operation input unit 114 includes an input device such as a keyboard and numeric keys, and is configured to detect an operation by an operator and output it to the arithmetic processing unit 130.

The screen display unit 115 is a screen display device such as a liquid crystal display (LCD) or a plasma display panel (PDP). The screen display unit 115 is configured to display various types of information such as an authentication result on a screen according to an instruction from the arithmetic processing unit 130.

The storage unit 120 is a storage device such as a hard disk or a memory. The storage unit 120 is configured to store processing information and a program 121 necessary for various types of processing to be performed in the arithmetic processing unit 130.

The program 121 implements various processing units by being read into the arithmetic processing unit 130 and executed. The program 121 is read, in advance, from an external device (not illustrated) or a storage medium (not illustrated) via a data input/output function such as the communication interface 113, and is stored in the storage unit 120.

Main processing information stored in the storage unit 120 includes reference face image data 122, a collation threshold 123, and an authentication history data 124.

The reference face image data 122 is data in which a face image serving as a reference to be used when face authentication is performed and a user ID are associated with each other. In the reference face image data 122, at least one face image of a person having a user ID can be associated with the user ID as a reference face image. Alternatively, in the reference face image data 122, the feature amount of a face extracted from a face image of a person having a user ID may be associated with the user ID as reference face information. Here, the feature amount of a face is a numerical value representing a feature of each part in a face image for recognizing the positional relationship or shape of each part such as eye, nose, mouth, eyebrow, or the like constituting the face, and is used for similarity determination or the like between images.

The collation threshold 123 is a threshold to be used for performing face authentication. In the case of the present embodiment, the collation threshold 123 is shared by every user ID.

The authentication history data 124 is data in which the similarity when the face authentication succeeded, the user ID, and the authentication time are associated with one another.

The arithmetic processing unit 130 is an arithmetic processing unit having a microprocessor such as an MPU and its peripheral circuits. The arithmetic processing unit 130 is configured to read the program 121 from the storage unit 120 and executes it to thereby allow the hardware and the program 121 to operate in cooperation with each other to implement various processing units. The processing units implemented by the arithmetic processing unit 130 includes the input unit 131, the face image acquisition unit 132, the collation unit 133, the output unit 134, the prediction unit 135, and the threshold change unit 136.

The input unit 131 is configured to receive the reference face image data 122 and the collation threshold 123 input from the outside via the communication interface 113 or the operation input unit 114, and store them in the storage unit 120.

The face image acquisition unit 132 is configured to receive image data captured by imaging a face of a person who is an authentication target from the camera unit 141, and acquire (detect) a face image of the authentication target from the image data. The face image acquisition unit 132 performs matching between a template representing a general face contour of a person and the image data to thereby acquire a face image existing in the image data. Besides template matching, various publicly-known face detection algorithms may be used. The face image acquisition unit 132 is configured to transmit the acquired face image to the collation unit 133.

The collation unit 133 is configured to read the reference face image data 122 and the collation threshold 123 from the storage unit 120, calculates, for each user ID, similarity between the reference face image included in the reference face image data 122 and a face image of the authentication target acquired by the face image acquisition unit 132, and based on the result of comparing the calculated similarity for each user ID with the collation threshold 123, determine whether or not the face image of the authentication target matches a reference face image of any user ID included in the reference face image data 152. As an example of similarity, a cross-correlation coefficient between face images may be used. In that case, the similarity becomes large when a face portion of the same person is included in the two face images, and the similarity becomes small when face portions of different persons are included in the two face image. As similarity between face images, besides the cross-correlation coefficient, publicly-known similarity calculation technique may be used. For example, the collation unit 133 may be configured to extract a feature amount of the face from the face image of the authentication target, collate the feature amount of the reference face included in the reference face image data 122 with the feature amount of the face extracted from the face image of the authentication target, and calculate the similarity between the reference face image and the face image of the authentication target.

The collation unit 133 is also configured to generate an authentication result representing authentication failure when there is no face image of the user ID in which the similarity with the face image of the authentication target acquired by the face image acquisition unit 132 is equal to or larger than the collation threshold 123, in the reference face image data 122. The collation unit 133 is also configured to, when there is at least one reference face image in which the similarity with the face image of the authentication target acquired by the face image acquisition unit 132 is equal to or larger than the collation threshold 123, generate an authentication result representing authentication success including the user ID having the maximum similarity, and the authentication history data 124 including the user ID having the maximum similarity, the similarity, and the authentication time. The collation unit 133 is also configured to transmit the authentication result to the output unit 134. The collation unit 133 is also configured to additionally register the authentication history data 124 as part of the authentication history data 124 having been stored in the storage unit 120.

The output unit 134 is configured to transmit the authentication result generated by the collation unit 133 to the gate apparatus 142 via the interface 112. The output unit 134 may also display the authentication result on the screen display unit 115, and/or transmit it to an external device via the communication interface 113.

The prediction unit 135 is configured to predict a change in the similarity when the time to change the collation threshold arrives, on the basis of the authentication history data 124 recorded in the storage unit 120. The time to change the collation threshold may be the time when a certain period has passed from the previous changing time, when the number of times of authentication success reaches a certain number of times after the previous changing time, when the number of times of authentication success for a predetermined specific user ID reaches a certain number of times after the previous changing time, or the like. The prediction unit 135 is also configured to transmit the predicted change in the similarity to the threshold change unit 136.

The threshold change unit 136 is configured to change the collation threshold 123 stored in the storage unit 120 on the basis of the change in the similarity predicted by the prediction unit 135.

Figure 3:
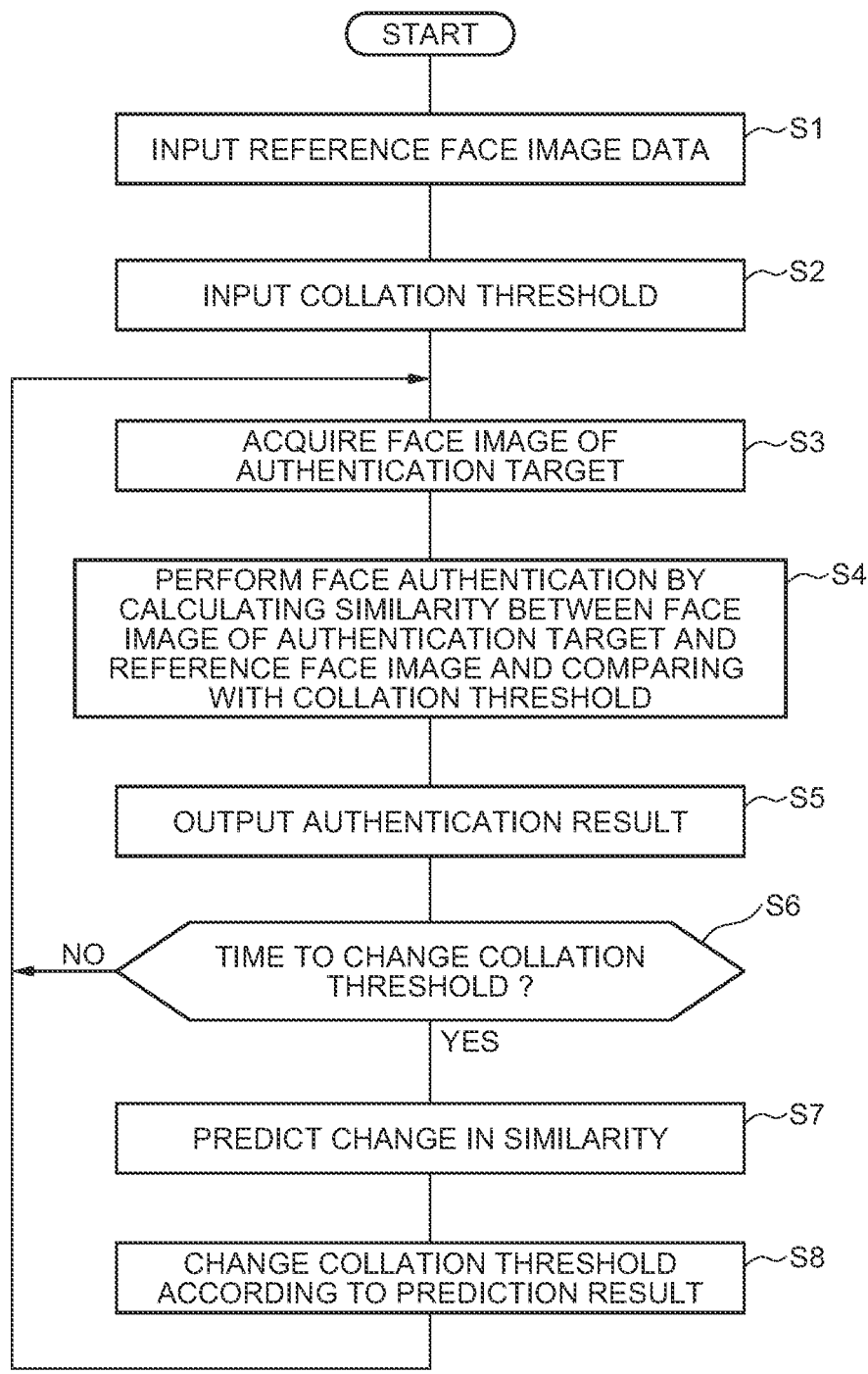
FIG. 3 is a flowchart illustrating the overall operation of the face authentication apparatus according to the first exemplary embodiment of the present invention.

FIG. 3 is a flowchart illustrating the overall operation of the face authentication apparatus 100. Referring to FIG. 3, first, the input unit 131 of the face authentication apparatus 100 receives the reference face image data 122 input from the outside, and stores it in the storage unit 120 (step S1). Then, the input unit 131 receives the collation threshold 123 input from the outside, and stores it in the storage unit 120 (step S2). The processes of steps S1 and S2 described above are preparation processes for starting operation of face authentication, and may be omitted if they have been performed once.

Next, the face image acquisition unit 132 of the face authentication apparatus 100 receives image data, obtained by capturing an authentication target by the camera unit 141 and input via the interface 111, and acquires the face image of the authentication target from the image data (step S3). Then, the collation unit 133 of the face authentication apparatus 100 calculates similarity between the reference face image included in the reference face image data 122 and the face image of the authentication target acquired by the face image acquisition unit 132, and compares the calculated similarity with the collation threshold 123, to thereby determine whether or not the face image of the authentication target matches any reference face image included in the reference face image data 122 (step S4). At that time, when there is no reference face image in which the similarity with the face image of the authentication target acquired by the face image acquisition unit 132 is equal to or larger than the collation threshold 123 in the reference face image data 122, the collation unit 133 generates an authentication result representing authentication failure and transmits the result to the output unit 134. When there is at least one reference face image in which the similarity with the face image of the authentication target acquired by the face image acquisition unit 132 is equal to or larger than the collation threshold 123, the collation unit 133 generates an authentication result representing authentication success including the user ID having the maximum similarity, and the authentication history data 124 including the user ID having the maximum similarity, the similarity, and the authentication time, and transmits the authentication result to the output unit 134 and registers the authentication history data 124 in the storage unit 120. Then, the output unit 134 of the face authentication apparatus 100 outputs the authentication result to the gate apparatus 142 via the interface 112 (step S5).

Further, the prediction unit 135 of the face authentication apparatus 100 determines whether or not the time to change the collation threshold 123 arrives (step S6), and if the changing time does not arrive, the prediction unit 135 returns to step S3 and repeats the same processes as those described above. On the other hand, if the changing time arrives, the prediction unit 135 predicts a change in the similarity on the basis of the authentication history data 124 stored in the storage unit 120 (step S7). Then, the threshold change unit 136 of the face authentication apparatus 100 changes the collation threshold 123 stored in the storage unit 120 on the basis of the change in the similarity predicted by the prediction unit 135. Then, the face authentication apparatus 100 returns to step S3 and repeats the same processes as those described above.

As described above, since a future change in the similarity is predicted based on the similarity history on authentication success and the collation threshold is changed based on the result of prediction, it is possible to change the collation threshold appropriately before the authentication fails.

Next, details of steps S7 and S8 performed by the prediction unit 135 and the threshold change unit 136 will be described.

Figure 4:
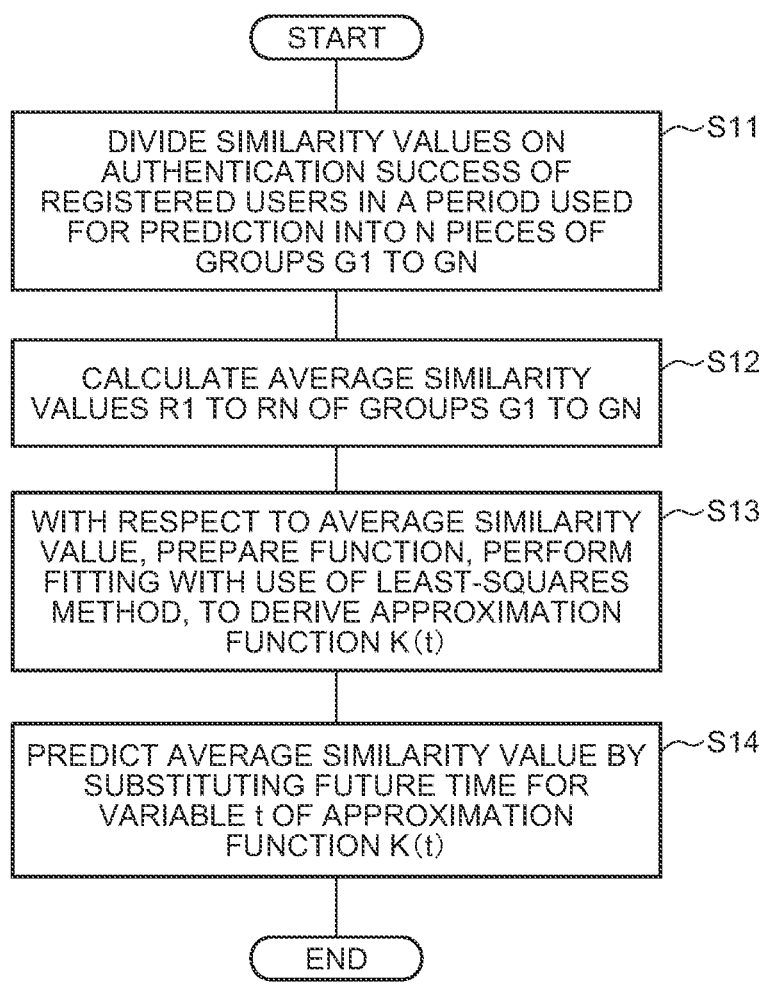
FIG. 4 is a flowchart illustrating an exemplary operation of a prediction unit of the face authentication apparatus according to the first exemplary embodiment of the present invention.

FIG. 4 is a flowchart illustrating an example of step S7 performed by the prediction unit 135. Referring to FIG. 4, the prediction unit 135 reads, from the storage unit 120, similarity values on authentication success in a period used for similarity prediction with respect to the authentication history data 124 of all user IDs, and divide them into N pieces of groups G1 to GN, each having the same duration, in the order of authentication time (step S11). For example, with use of a time Tc set in advance and a positive integer N, the prediction unit 135 reads similarity values, regardless of the user ID, in the authentication history data 154 having the authentication time after a time (t0−Tc×N) that is Tc*N hours before the current time t0 from the storage unit 120, and divide them into N pieces of groups G1 to GN each having the same duration, in the order of authentication time.

Figure 5:
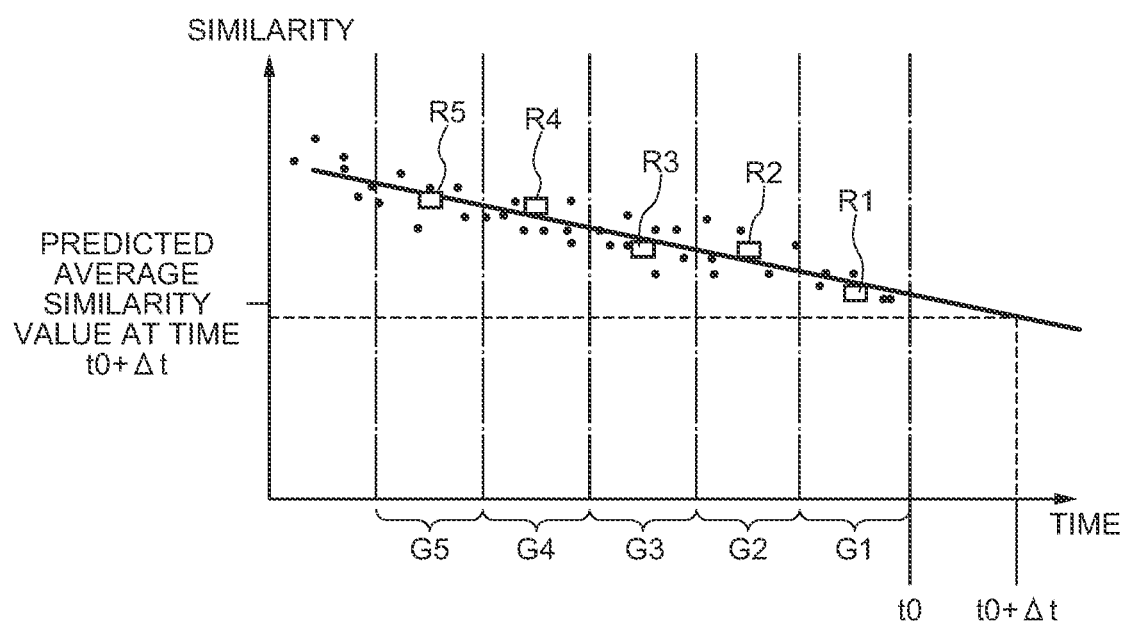
FIG. 5 is a graph for illustrating an example of a similarity prediction process by the face authentication apparatus according to the first exemplary embodiment of the present invention.

FIG. 5 is a graph representing distribution of similarity values on authentication success with black dots, in which the vertical axis indicates similarity and the horizontal axis indicates time. The grouping of step S11 corresponds to grouping the distribution of similarity values represented by black dots in the time axis direction like the groups G1 to G5 of FIG. 5.

Then, the prediction unit 135 calculates average similarity values R1 to RN of the respective groups (Step S12). In the case where one group includes M pieces of similarity values, the prediction unit 135 calculates the average value by dividing the sum of the M pieces of prediction values by M. A rectangular mark in the graph of FIG. 5 represents each of the average similarity values R1 to R5 of the respective groups.

Then, the prediction unit 135 prepares a function (for example, linear function) with respect to the average similarity values R1 to RN, and performs fitting with use of the least-squares method to generate an approximation function K(t) (step S13). For example, the approximation function K(t) is expressed as shown below.

$$K(t)=a \cdot t+b \tag{1}$$

where "a" and "b" represent constants determined by the least-squares method.

A line segment in the graph of FIG. 5 represents the approximation function K(t).

Then, the prediction unit 135 predicts an average similarity value of a future time by substituting the future time for the variable t in the approximation function K(t) (step S14). FIG. 5 illustrates an average similarity value at the point of future time t0+Δt. Δt may be a fixed value or a variable value.

Figure 6:
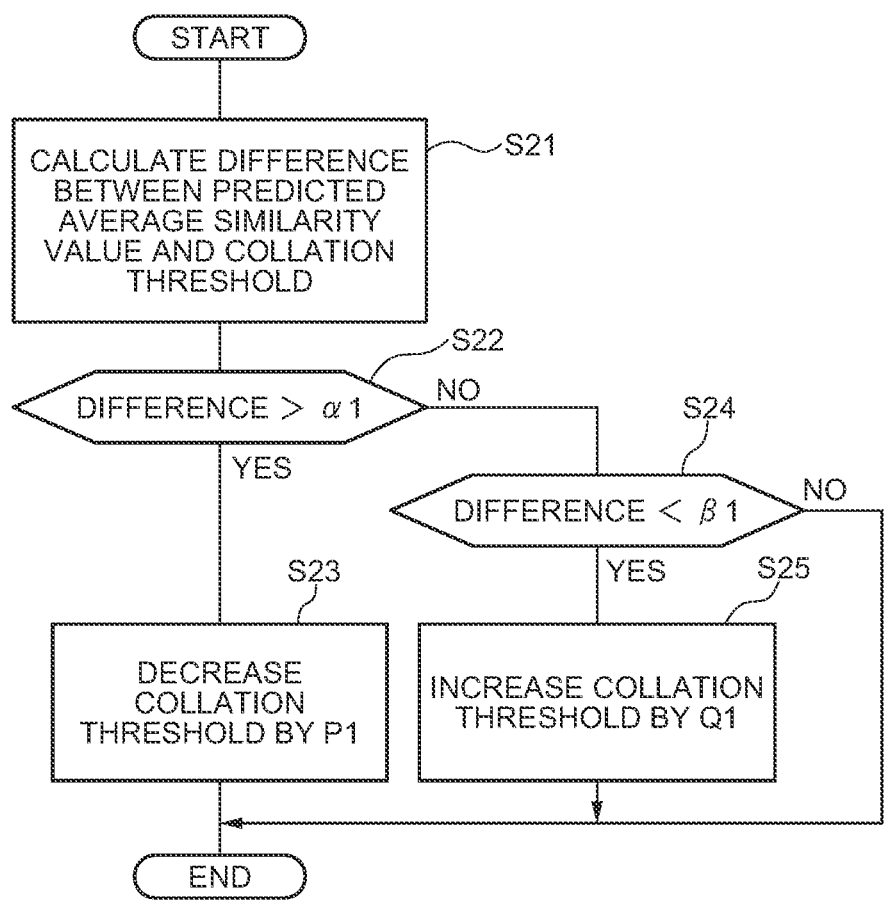
FIG. 6 is a flowchart illustrating an exemplary operation of a threshold change unit of the face authentication apparatus according to the first exemplary embodiment of the present invention.

FIG. 6 is a flowchart illustrating an example of step S8 performed by the threshold change unit 136. Referring to FIG. 6, the threshold change unit 136 calculates a difference between the current collation threshold 123 and the average similarity value predicted by the prediction unit 135 (step S21). Then, the threshold change unit 136 compares the difference with a preset value α1 (step S22), and when the difference is larger than the value α1, the threshold change unit 136 determines that the current collation threshold 123 is too large, and changes the collation threshold 123 to be smaller by a predetermined value P1 (step S23). Meanwhile, when the difference is equal to or smaller than the value α1, the threshold change unit 136 compares the difference with a preset value β1 (β1<α1) (step S24), and when the difference is smaller than the value β1, the threshold change unit 136 determines that the current collation threshold 123 is too small, and changes the collation threshold 123 to be larger by a predetermined value Q1 (step S25). In the case other than those described above, that is, when the difference is equal to or smaller than the value α1 and is equal to or larger than the value β1, the threshold change unit 136 does not change the current collation threshold 123.

According to the operation of the prediction unit 135 and the threshold change unit 136 described with reference to FIGS. 4 to 6, a change in the average similarity value on authentication success is predicted based on the similarity history on authentication success of a plurality of users, and the collation threshold 123 shared by the users is changed based on the prediction result of the average similarity value. Therefore, the prediction unit 135 and the threshold change unit 136 described with reference to FIGS. 4 to 6 are suitable when being applied to the environment where similarity values of a large number of uses are similarly changed by the same factor. An example of such application will be described below with reference to FIG. 2.

FIG. 2 is a schematic diagram of an access management system including the face authentication apparatus 100 according to the present embodiment, as described above. With reference to FIG. 2, the camera unit 141 of the face authentication apparatus 100 is configured to acquire a face image of the user 143 who passes through the gate apparatus 142. The face authentication apparatus 100 performs face authentication on the face image of the user 143 captured by the camera unit 141, and transmits the authentication result to the gate apparatus 142 from the interface 112. The gate apparatus 142 is configured to open the gate when the authentication result indicates success, and close the gate when the authentication result indicates failure. In such a system, there is a case where the quality of the face image of the user 143 deteriorates due to the afternoon sun. In that case, the quality of face image of almost all users who pass through the gate apparatus 142 is affected, irrespective of the user. Therefore, with use of the face authentication apparatus 100 of the present embodiment, when the quality of the face image of the user 143 deteriorates due to the afternoon sun and the average similarity value drops, the collation threshold 123 is automatically changed to be smaller, accordingly. As a result, it is possible to prevent false rejection from occurring, so that the convenience is improved. Moreover, when the influence of the afternoon sun drops and the quality of the face image of the user 143 who passes through the gate apparatus 142 is improved, whereby the average similarity value is increased, the collation threshold 123 is automatically changed to be larger, accordingly. As a result, the security strength can be enhanced again.

The grounds for affecting the similarity of a number of users include, besides the afternoon sun described as an example in FIG. 2, a change in the illuminance of lighting equipment due to a secular change, a change in the illuminance due to bad weather, an increase in the rate of wearing a mask in the pollen fever season, a decrease in the rate of acquiring a front face in rainy weather when people tend to look down, and the like. The face authentication apparatus 100 of the present invention is effective to these grounds. In the case where a plurality of gate apparatuses 142 are provided at the same place, how the afternoon sun affects or an influence of deteriorated lighting may differ between the gate apparatuses. Therefore, it is desirable to predict a change in the similarity on the basis of the similarity history on authentication success for each gate apparatus, and change the collation threshold according to the prediction result. However, if there are a plurality of gate apparatuses in which how the afternoon sun affects or the influence of deteriorated lighting is almost the same, it is possible to perform prediction of a change in the similarity and determination of the collation threshold after the change on any one of the gate apparatuses, and change the collation thresholds for the gate apparatuses with use of the determined collation threshold after the change.

Figure 7:
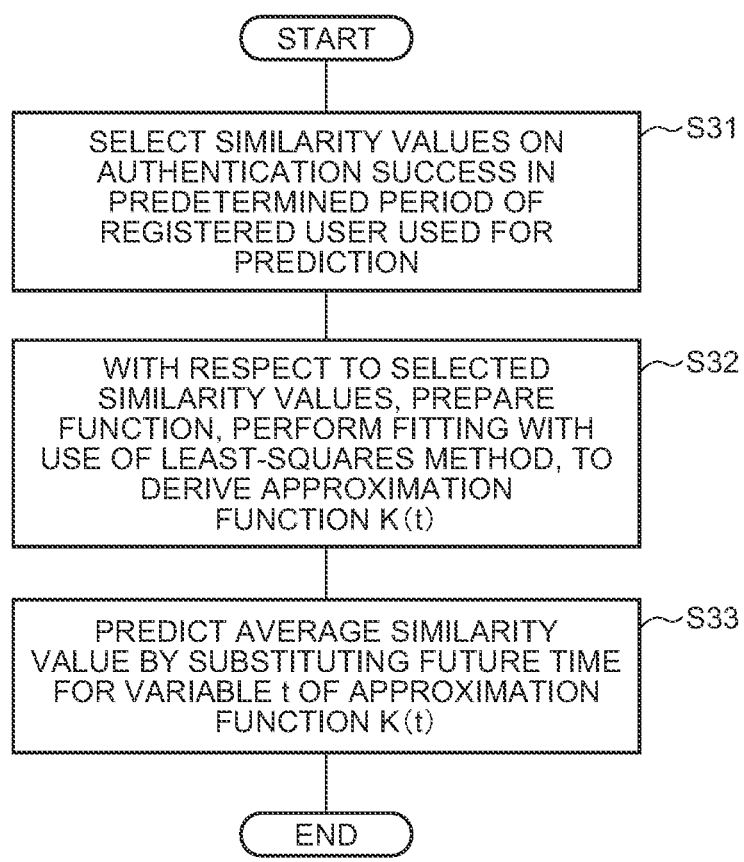
FIG. 7 is a flowchart illustrating another exemplary operation of the prediction unit of the face authentication apparatus according to the first exemplary embodiment of the present invention.

FIG. 7 is a flowchart illustrating another example of step S7 performed by the prediction unit 135. Referring to FIG. 7, the prediction unit 135 selects similarity values in a predetermined period from the authentication history data 124 including a specific user ID to be used for prediction of similarity (step S31). For example, the prediction unit 135 selects and reads, from the storage unit 120, similarity values in the authentication history data 124 having a predetermined specific user ID and having the authentication time after the time (t0−T) before the predetermined time T. The specific user ID is desirably a registered user who is frequently handled as an authentication target relatively and has an average similarity value, but is not limited thereto.

Figure 8:
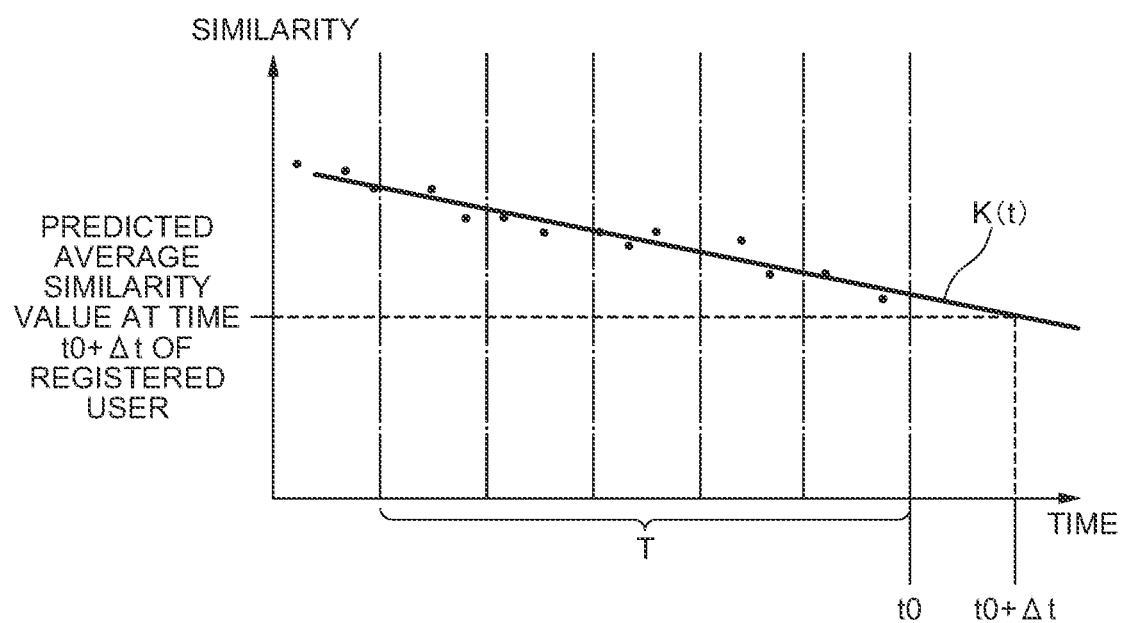
FIG. 8 is a graph for illustrating another example of a similarity prediction process by the face authentication apparatus according to the first exemplary embodiment of the present invention.

FIG. 8 is a graph representing distribution of similarity values of a specific user ID on authentication success with black dots, in which the vertical axis indicates similarity and the horizontal axis indicates time.

Next, the prediction unit 135 prepares a function (for example, linear function) with respect to the similarity values of the specific user ID, and performs fitting with use of the least-squares method to generate an approximation function K(t) (step S32). For example, the approximation function K(t) is expressed as Expression 1 described above. A line segment in the graph of FIG. 8 represents the approximation function K(t).

Then, the prediction unit 135 predicts a similarity value on authentication success of the specific user ID at a future time by substituting the future time for the variable tin the approximation function K(t) (step S33). FIG. 8 illustrates a similarity value on authentication success of the specific user ID at the point of future time t0+Δt. At may be a fixed value or a variable value.

Figure 9:
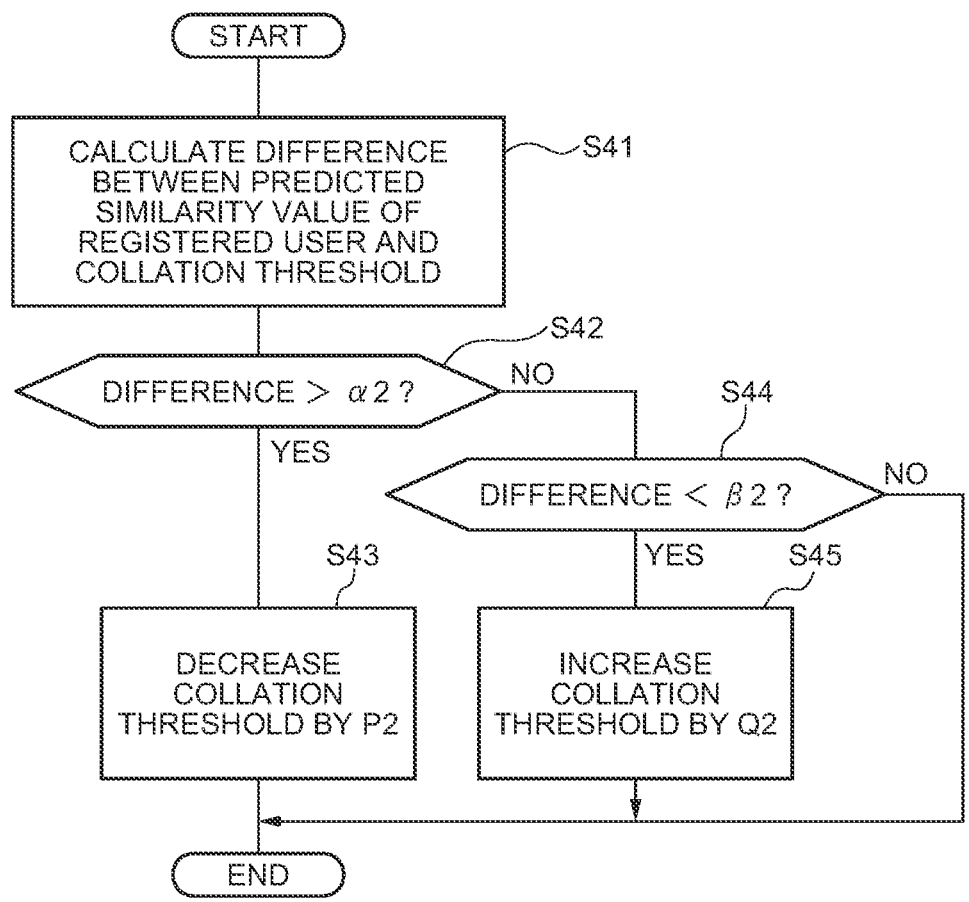
FIG. 9 is a flowchart illustrating another exemplary operation of a threshold change unit of the face authentication apparatus according to the first exemplary embodiment of the present invention.

FIG. 9 is a flowchart illustrating another example of step S8 performed by the threshold change unit 136. Referring to FIG. 9, the threshold change unit 136 calculates a difference between the current collation threshold 123 and a similarity value on authentication success of the specific user ID predicted by the prediction unit 135 (step S41). Then, the threshold change unit 136 compares the difference with a preset value α2 (step S42), and when the difference is larger than the value α2, the threshold change unit 136 determines that the current collation threshold 123 is too large, and changes the collation threshold 123 to be smaller by a predetermined value P2 (step S43). Meanwhile, when the difference is equal to or smaller than the value α2, the threshold change unit 136 compares the difference with a preset value β2 (β1<α2) (step S44), and when the difference is smaller than the value β2, the threshold change unit 136 determines that the current collation threshold 123 is too small, and changes the collation threshold 123 to be larger by a predetermined value Q2 (step S45). In other cases, that is, when the difference is equal to or smaller than the value α2 and is equal to or larger than the value β2, the threshold change unit 136 does not change the current collation threshold 123.

According to the operation of the prediction unit 135 and the threshold change unit 136 described with reference to FIGS. 7 to 9, a change in the similarity on authentication success of a specific user is predicted based on the similarity history on authentication success of the specific user, and the collation threshold 123 shared by a plurality of users is changed based on the prediction result. Therefore, the prediction unit 135 and the threshold change unit 136 described with reference to FIGS. 7 to 9 are suitable when being applied to the environment where the similarity on authentication success of a specific user is changed by the same factor in the same way as the similarity on authentication success of a large number of other users. As an exemplary application thereof, the system described in FIG. 2 will be considered.

Second Exemplary Embodiment

Figure 10:
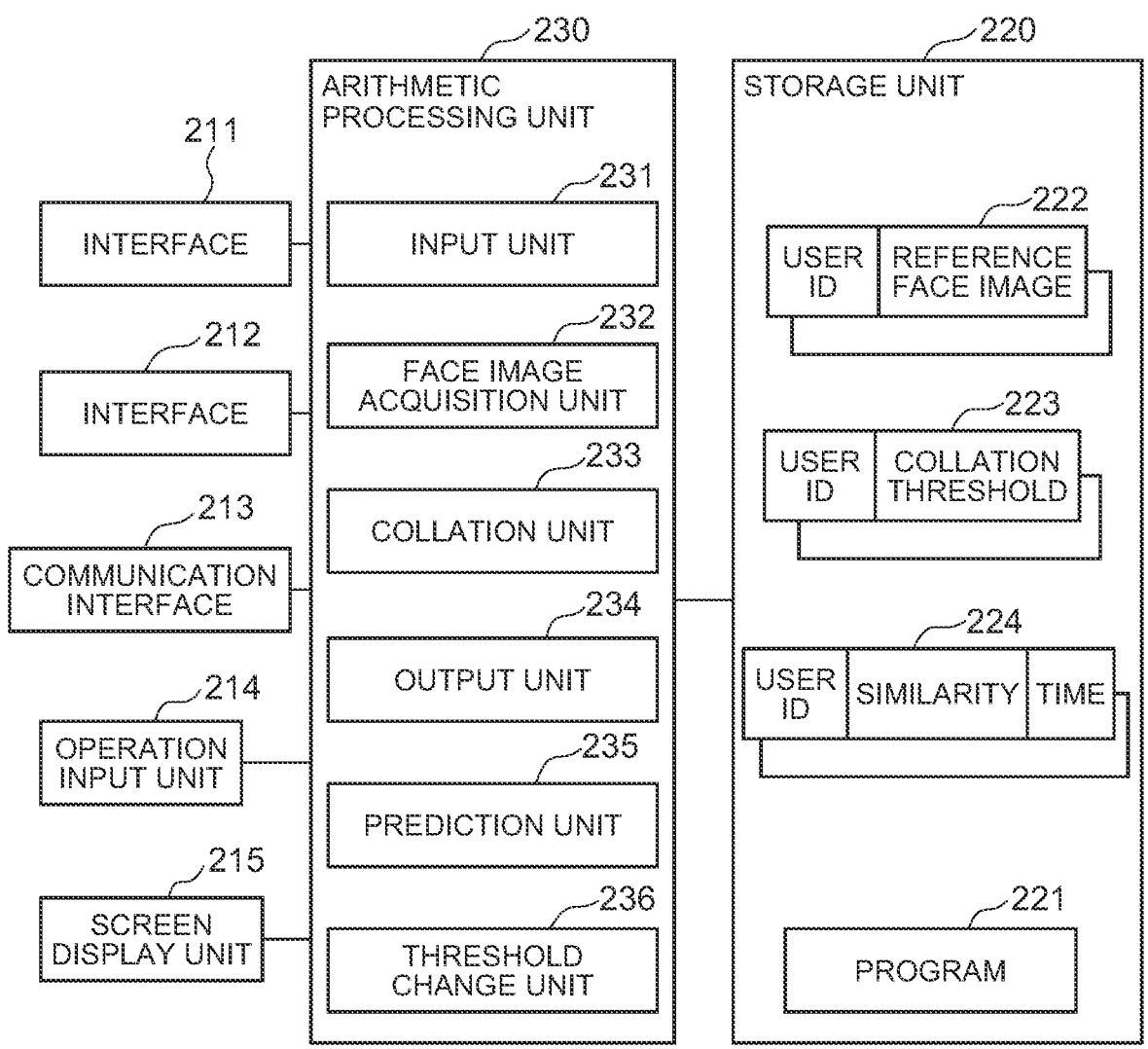
FIG. 10 is a block diagram of a face authentication apparatus according to a second exemplary embodiment of the present invention.

FIG. 10 is a block diagram of a face authentication apparatus 200 according to a second exemplary embodiment of the present invention. The face authentication apparatus 200 of the present embodiment includes an interface 211 with the camera unit 141, an interface 212 with the gate apparatus 142, a communication interface 213, an operation input unit 214, a screen display unit 215, a storage unit 220, and an arithmetic processing unit 230. Among them, the interface 211, the interface 212, the communication interface 213, the operation input unit 214, and the screen display unit 215 are configured similarly to the interface 111, the interface 112, the communication interface 113, the operation input unit 114, and the screen display unit 115 illustrated in FIG. 1.

The storage unit 220 is a storage device such as a hard disk or a memory. The storage unit 220 is configured to store processing information and a program 221 necessary for various types of processing to be performed in the arithmetic processing unit 230.

The program 221 implements various processing units by being read into the arithmetic processing unit 230 and executed. The program 221 is read, in advance, from an external device (not illustrated) or a storage medium (not illustrated) via a data input/output function such as the communication interface 213, and is stored in the storage unit 220.

Main processing information stored in the storage unit 220 includes reference face image data 222, a collation threshold 223, and authentication history data 224. Among them, the reference face image data 222 and the authentication history data 224 are configured similarly to the reference face image data 122 and the authentication history data 124 of FIG. 1.

The collation threshold 223 is a threshold to be used for performing face authentication. In the case of the present embodiment, the collation threshold 223 is present for each user ID.

The arithmetic processing unit 230 is an arithmetic processing unit having a microprocessor such as an MPU and its peripheral circuits. The arithmetic processing unit 230 is configured to read the program 221 from the storage unit 220 and executes it to thereby allow the hardware and the program 221 to operate in cooperation with each other to implement various processing units. The processing units implemented by the arithmetic processing unit 230 include the input unit 231, the face image acquisition unit 232, the collation unit 233, the output unit 234, the prediction unit 235, and the threshold change unit 236. Among them, the input unit 231, the face image acquisition unit 232, and the output unit 234 are configured similarly to the input unit 131, the face image acquisition unit 132, and the output unit 134 of FIG. 1.

The collation unit 233 differs from the collation unit 133 of FIG. 1 in comparing similarity between a face image of the authentication target and a reference face image for each user ID with the collation threshold 223 for each user ID. The other aspects are the same as those of the collation unit 133.

The prediction unit 235 differs from the prediction unit 135 of FIG. 1 in predicting a change in similarity on authentication success for each user ID by using the authentication history data 224 of each user ID. The other aspects are the same as those of the prediction unit 135. That is, the prediction unit 235 repeats processing that is the same as the processing illustrated in FIG. 7 for each user ID to thereby derive the approximation function K(t) for each user ID.

The threshold change unit 236 is configured to change the collation threshold 223 for each user ID stored in the storage unit 220 on the basis of the change in the similarity for each user ID predicted by the prediction unit 235. That is, the threshold change unit 236 repeats processing that is the same as that illustrated in FIG. 9 for each user ID, and if the difference between the predicted similarity and the current collation threshold is larger than a predetermined value, the threshold change unit 236 changes the collation threshold to be smaller by a predetermined value, while if the difference is smaller than the predetermined value, changes the collation threshold to be larger by the predetermined value, and does not change the collation threshold in other cases.

According to the present embodiment, on the basis of the history of the similarity on authentication success of a user ID, a change in the similarity on authentication success of the user ID is predicted, and the collation threshold for the user ID is changed on the basis of the prediction result. Therefor, a collation threshold set to each user ID can be automatically changed appropriately following the secular change in the face image of each user.

In the present embodiment, on the basis of the history of the similarity on authentication success of a user ID, a change in the similarity on authentication success of the user ID is predicted, and the collation threshold for the user ID is changed on the basis of the prediction result. However, as a modification of the present embodiment, it is possible to have a configuration of predicting a change in the average similarity on collation success of a plurality of users on the basis of the similarity history on collation success of the users, and changing the collation threshold for each user ID based on the prediction result of the average similarity by the same method as that illustrated in FIG. 6.

Third Exemplary Embodiment

Figure 11:
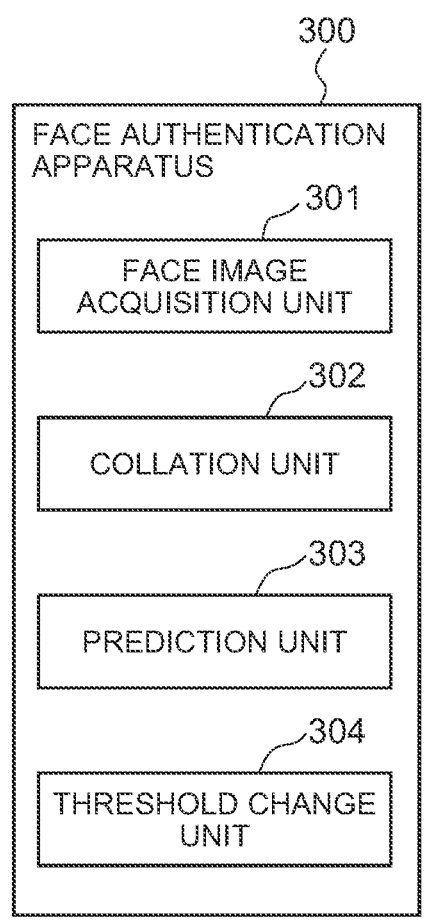
FIG. 11 is a block diagram of a face authentication apparatus according to a third exemplary embodiment of the present invention.

FIG. 11 is a block diagram of a face authentication apparatus 300 according to a third exemplary embodiment of the present invention. Referring to FIG. 11, the face authentication apparatus 300 of the present embodiment includes a face image acquisition unit 301, a collation unit 302, a prediction unit 303, and a threshold change unit 304.

The face image acquisition unit 301 is configured to acquire a face image of an authentication target. The face image acquisition unit 301 may have the same configuration as that of the face image acquisition unit 132 of FIG. 1, but it is not limited thereto.

The collation unit 302 is configured to perform face authentication by calculating similarity between face information based on the face image of the authentication target acquired by the face image acquisition unit 301 and the reference face information of each registered user, and comparing the similarity with a threshold. The collation unit 302 may have the same configuration as that of the collation unit 133 of FIG. 1 for example, but it is not limited thereto.

The prediction unit 303 is configured to predict a change in the similarity on the basis of the similarity history on authentication success by the collation unit 302. The prediction unit 303 may have the same configuration as that of the prediction unit 135 of FIG. 1 or the prediction unit 235 of FIG. 10 for example, but it is not limited thereto.

The threshold change unit 304 is configured to change the threshold to be used by the collation unit 302, on the basis of the prediction result by the prediction unit 303. The threshold change unit 304 may have the same configuration as that of the threshold change unit 136 of FIG. 1 or the threshold change unit 236 of FIG. 10, but it is not limited thereto.

The face authentication apparatus 300 according to the present embodiment configured as described above operates as described below. First, the face image acquisition unit 301 acquires a face image of the authentication target. Then, the collation unit 302 performs face authentication by calculating similarity between face information based on the face image of the authentication target and the reference face information of each registered user and comparing the similarity with a threshold. Then, the prediction unit 303 predicts a change in the similarity on the basis of the similarity history on authentication success. Then, the threshold change unit 304 changes the threshold on the basis of the prediction result.

As described above, according to the present embodiment, since a change in the similarity is predicted based on the similarity history on authentication success and a threshold used for collation is changed based on the prediction result, it is possible to change the threshold appropriately before the authentication fails.

While the present invention has been described with reference to the exemplary embodiments described above, the present invention is not limited to the above-described embodiments. The form and details of the present invention can be changed within the scope of the present invention in various manners that can be understood by those skilled in the art.

INDUSTRIAL APPLICABILITY

The present invention is applicable to an access monitoring system, an attendance management system, and the like, and in particular, suitable for the case of improving convenience and security by automatically correct the threshold used for collation appropriately without placing a burden on the users.

The whole or part of the exemplary embodiments disclosed above can be described as, but not limited to, the following supplementary notes.

(Supplementary Note 1)
A face authentication apparatus comprising:
a face image acquisition unit that acquires a face image of an authentication target;
a collation unit that performs face authentication by calculating similarity between face information based on the face image of the authentication target and reference face information of each registered user and comparing the similarity with a threshold;
a prediction unit that predicts a change in the similarity on a basis of a similarity history on authentication success; and
a threshold change unit that changes the threshold on a basis of a result of the prediction.

(Supplementary Note 2)
The face authentication apparatus according to supplementary note 1, wherein
the prediction unit predicts the change in the similarity by generating an approximation function representing the change in the similarity as a function of time with use of the similarity history on the authentication success.

(Supplementary Note 3)
The face authentication apparatus according to supplementary note 1 or 2, wherein
the prediction unit is configured to classify similarity values in the similarity history on the authentication success of a plurality of registered users into a plurality of groups on a basis of authentication time, calculate an average similarity value on the authentication success of the registered users for each of the groups, and generate an approximation function representing a change in the similarity as a function of time with use of the average similarity value, to thereby predict a change in the average similarity value.

(Supplementary Note 4)
The face authentication apparatus according to supplementary note 3, wherein
the threshold change unit changes the threshold on a basis of a prediction result of the change in the average similarity value.

(Supplementary Note 5)
The face authentication apparatus according to supplementary note 1 or 2, wherein
the prediction unit is configured to, with use of the similarity history on the authentication success of one registered user, generate an approximation function representing a change in the similarity as a function of time to thereby predict a change in the similarity on the authentication success of the one registered user.

(Supplementary Note 6)
The face authentication apparatus according to supplementary note 5, wherein
the threshold change unit changes the threshold on a basis of a prediction result of the change in the similarity on the authentication success of the one registered user.

(Supplementary Note 7)
The face authentication apparatus according to any of supplementary notes 1 to 6, wherein
the threshold is a common threshold set to the plurality of the registered users.

(Supplementary Note 8)
The face authentication apparatus according to any of supplementary notes 1 to 6, wherein
the threshold is a threshold set to each of the registered users.

(Supplementary Note 9)
The face authentication apparatus according to supplementary note 1 or 2, wherein
the collation unit is configured to, on a basis of a result of comparing the similarity between the face image of the authentication target and a reference face image of each registered user registered in advance with a threshold common to a plurality of the registered users, determine a reference face image of any of the registered users that the face image of the authentication target matches, and generate authentication history data including the similarity when the face image is determined to match and authentication time,
the prediction unit is configured to classify the authentication history data into a plurality of groups on a basis of the authentication time, calculate an average similarity value for each of the groups, and generate an approximation function representing a change in the similarity as a function of time with use of the average similarity value, to thereby predict a change in the average similarity value, and
the threshold change unit is configured to change the common threshold on a basis of a prediction result of the change in the average similarity value.

(Supplementary Note 10)
The face authentication apparatus according to supplementary note 1 or 2, wherein
the collation unit is configured to, on a basis of a result of comparing the similarity between the face image of the authentication target and a reference face image of each registered user registered in advance with a common threshold for a plurality of the registered users, determine a reference face image of any of the registered users that the face image of the authentication target matches, and generate authentication history data including the similarity when the face image is determined to match, user identification information uniquely identifying the registered user, and authentication time,
the prediction unit is configured to classify the authentication history data into a plurality of groups by the user identification information, and, for at least one of the groups, generate an approximation function representing a change in the similarity as a function of time with use of the similarity of the group, to thereby predict a change in the similarity of the group, and
the threshold change unit is configured to change the common threshold on a basis of a prediction result of the change in the similarity of the group.

(Supplementary Note 11)
The face authentication apparatus according to supplementary note 1 or 2, wherein
the collation unit is configured to, on a basis of a result of comparing the similarity between the face image of the authentication target and a reference face image of each registered user registered in advance with a threshold for the each registered user, determine a reference face image of any of the registered users that the face image of the authentication target matches, and generate authentication history data including the similarity when the face image is determined to match, user identification information uniquely identifying the registered user, and authentication time, the prediction unit is configured to classify the authentication history data into a plurality of groups by the user identification information, and, for at least one of the groups, generate an approximation function representing a change in the similarity as a function of time with use of the similarity of the group, to thereby predict a change in the similarity of the group, and the threshold change unit is configured to change the threshold of the registered user corresponding to the group on a basis of a prediction result of the change in the similarity of the group.

(Supplementary Note 12)

The face authentication apparatus according to supplementary note 1 or 2, wherein the collation unit is configured to, on a basis of a result of comparing the similarity between the face image of the authentication target and a reference face image of each registered user registered in advance with a threshold for the each registered user, determine a reference face image of any of the registered users that the face image of the authentication target matches, and generate authentication history data including the similarity when the face image is determined to match and authentication time, the prediction unit is configured to classify the authentication history data into a plurality of groups on a basis of the authentication time, calculate an average similarity value for each of the groups, and generate an approximation function representing a change in the similarity as a function of time with use of the average similarity value, to thereby predict a change in the average similarity value, and the threshold change unit is configured to change the threshold of the each registered user on a basis of a prediction result of the change in the average similarity value.

(Supplementary Note 13)

The face authentication apparatus according to any of supplementary notes 1 to 12, wherein in the face authentication, a feature amount of a face extracted from the face image of the authentication target and a feature amount of a face extracted from a reference face image of each registered user are collated with each other, and similarly between the face image of the authentication target and the reference face image is calculated.

(Supplementary Note 14)

A face authentication method comprising:
acquiring a face image of an authentication target;
performing face authentication by calculating similarity between face information based on the face image of the authentication target and reference face information of each registered user and comparing the similarity with a threshold;
predicting a change in the similarity on a basis of a similarity history on authentication success; and
changing the threshold on a basis of a result of the prediction.

(Supplementary Note 15)

The face authentication method according to supplementary note 14, wherein the predicting includes predicting the change in the similarity by generating an approximation function representing the change in the similarity as a function of time with use of the similarity history on the authentication success.

(Supplementary Note 16)

The face authentication method according to supplementary note 14 or 15, wherein the predicting includes classifying similarity values in the similarity history on the authentication success of a plurality of registered users into a plurality of groups on a basis of authentication time, calculating an average similarity value on the authentication success of the registered users for each of the groups, generating an approximation function representing a change in the similarity as a function of time with use of the average similarity value, thereby predicting a change in the average similarity value.

(Supplementary Note 17)

The face authentication method according to supplementary note 16, wherein the changing includes changing the threshold on a basis of a prediction result of the change in the average similarity value.

(Supplementary Note 18)

The face authentication method according to supplementary note 14 or 15, wherein the predicting includes, with use of the similarity history on the authentication success of one registered user, generating an approximation function representing a change in the similarity as a function of time, thereby predicting a change in the similarity on the authentication success of the one registered user.

(Supplementary Note 19)

The face authentication method according to supplementary note 18, wherein the changing includes changing the threshold on a basis of a prediction result of the change in the similarity on the authentication success of the one registered user.

(Supplementary Note 20)

The face authentication method according to any of supplementary notes 14 to 19, wherein the threshold is a common threshold set to the plurality of the registered users.

(Supplementary Note 21)

The face authentication method according to any of supplementary notes 14 to 19, wherein the threshold is a threshold set to each of the registered users.

(Supplementary Note 22)

The face authentication method according to supplementary note 14 or 15, wherein the face authentication includes, on a basis of a result of comparing the similarity between the face image of the authentication target and a reference face image of each registered user registered in advance with a common threshold for a plurality of the registered users, determining a reference face image of any of the registered users that the face image of the authentication target matches, and generating authentication history data including the similarity when the face image is determined to match and an authentication time, the predicting includes classifying the authentication history data into a plurality of groups on a basis of the authentication time, calculating an average similarity value for each of the groups, and generating an approximation function representing a change in the similarity as a function of time with use of the average similarity value, thereby predicting a change in the average similarity value, and the changing includes changing the common threshold on a basis of a prediction result of the change in the average similarity value.

(Supplementary Note 23)

The face authentication method according to supplementary note 14 or 15, wherein the face authentication includes, on a basis of a result of comparing the similarity between the face image of the authentication target and a reference face image of each registered user registered in advance with a common threshold for a plurality of the registered users, determining a reference face image of any of the registered users that the face image of the authentication target matches, and generating authentication history data including the similarity when the face image is determined to match, user identification information uniquely identifying the registered user, and authentication time, the predicting includes classifying the authentication history data into a plurality of groups by the user identification information, and, for at least one of the groups, generating an approximation function representing a change in the similarity as a function of time with use of the similarity of the group, thereby predicting a change in the similarity of the group, and the changing includes changing the common threshold on a basis of a prediction result of the change in the similarity of the group.

(Supplementary Note 24)

The face authentication method according to supplementary note 14 or 15, wherein the face authentication includes, on a basis of a result of comparing the similarity between the face image of the authentication target and a reference face image of each registered user registered in advance with a threshold for the each registered user, determining a reference face image of any of the registered users that the face image of the authentication target matches, and generating authentication history data including the similarity when the face image is determined to match, user identification information uniquely identifying the registered user, and authentication time, the predicting includes classifying the authentication history data into a plurality of groups by the user identification information, and, for at least one of the groups, generating an approximation function representing a change in the similarity as a function of time with use of the similarity of the group, thereby predicting a change in the similarity of the group, and the changing includes changing the threshold of the registered user corresponding to the group on a basis of a prediction result of the change in the similarity of the group.

(Supplementary Note 25)

The face authentication methods according to supplementary note 14 or 15, wherein the face authentication includes, on a basis of a result of comparing the similarity between the face image of the authentication target and a reference face image of each registered user registered in advance with a threshold for the each registered user, determining a reference face image of any of the registered users that the face image of the authentication target matches, and generating authentication history data including the similarity when the face image is determined to match and authentication time, the predicting includes classifying the authentication history data into a plurality of groups on a basis of the authentication time, calculating an average similarity value for each of the groups, and generating an approximation function representing a change in the similarity as a function of time with use of the average similarity value, thereby predicting a change in the average similarity value, and the changing includes changing the threshold of the each registered user on a basis of a prediction result of the change in the average similarity value.

(Supplementary Note 26)

The face authentication method according to any of supplementary notes 14 to 25, wherein the face authentication includes collating a feature amount of a face extracted from the face image of the authentication target with a feature amount of a face extracted from a reference face image of each registered user, and calculating the similarly between the face image of the authentication target and the reference face image.

(Supplementary Note 27)

A computer-readable medium storing a program for causing a computer to function as:

a face image acquisition unit that acquires a face image of an authentication target;

a collation unit that performs face authentication by calculating similarity between face information based on the face image of the authentication target and reference face information of each registered user and comparing the similarity with a threshold;

a prediction unit that predicts a change in the similarity on a basis of a similarity history on authentication success; and a threshold change unit that changes the threshold on a basis of a result of the prediction.

REFERENCE SIGNS LIST 100 face authentication apparatus
111 interface
112 interface
113 communication interface
114 operation input unit
115 screen display unit
120 storage unit
121 program
122 reference face image data
123 collation threshold
124 authentication history data
130 arithmetic processing unit
131 input unit
132 face image acquisition unit
133 collation unit
134 output unit
135 prediction unit
136 threshold change unit
141 camera unit
142 gate apparatus
143 user
200 face authentication apparatus
211 interface
212 interface 213 communication interface
214 operation input unit
215 screen display unit
220 storage unit
221 program
222 reference face image data
223 collation threshold
224 authentication history data
230 arithmetic processing unit
231 input unit
232 face image acquisition unit
233 collation unit
234 output unit
235 prediction unit
236 threshold change unit
300 face authentication apparatus
301 face image acquisition unit
302 collation unit
303 prediction unit
304 threshold change unit

The invention claimed is:

1. A gate apparatus comprising:
at least one memory configured to store instructions; and
at least one processor configured to execute the instructions to:
generate, based on similarity values in a similarity history of authentication success and authentication time, a function representing a change in the similarity as a function of time;
predict a change in the similarity based on the generated function, by determining a predicted future average similarly value based on the function; and
calculate a difference between the predicted future average similarity value and the threshold;
in response to the difference being greater than a preset value, decrease the threshold;
in response to the difference being less than the preset value, increase the threshold;
perform face authentication by comparing similarity between face information of a face of a target and reference face information of each of a plurality of registered users with the changed threshold; and
control at least one of a gate door, a gate bar, a gate lock, message, and sound based on a result of the face authentication.

2. The gate apparatus according to claim 1, wherein the threshold is a common threshold set for all the plurality of the registered users.

3. The gate apparatus according to claim 1, wherein the threshold is a threshold set for each of the plurality of registered users.

4. A gate apparatus comprising:
classify the similarity values in a similarity history of authentication success into a plurality of groups based on authentication time;
calculate a first average similarity value of the similarity values in a first time period;
calculating a second average similarity value of the similarity values in a second time period;
generate, based on the first average similarity value and the second average similarity value, a function representing a change in the similarity as a function of time, by performing a fitting operation using a least-squares method;
change a threshold based on similarity values in a similarity history of authentication success and authentication time;
perform face authentication by comparing similarity between face information of a face of a target and reference face information of each of a plurality of registered users with the changed threshold; and
control at least one of a gate door, a gate bar, a gate lock, message, and sound based on a result of the face authentication.

5. A method comprising:
generating, by a processor and based on similarity values in a similarity history of authentication success and authentication time, a function representing a change in the similarity as a function of time;
predicting, by the processor, a change in the similarity based on the generated function, by determining a predicted future average similarly value based on the function; and
calculating, by the processor, a difference between the predicted future average similarity value and the threshold;
in response to the difference being greater than a preset value, decreasing, by the processor, the threshold;
in response to the difference being less than the preset value, increasing, by the processor, the threshold;
performing, by the processor, face authentication by comparing similarity between face information of a face of a target and reference face information of each of a plurality of registered users with the changed threshold; and
controlling, by the processor, at least one of a gate door, a gate bar, a gate lock, message, and sound based on a result of the face authentication.

* * * * *